June 12, 1951 R. B. MENTZER 2,557,055
SURFACE ORNAMENTING MACHINE
Filed Nov. 15, 1946 3 Sheets-Sheet 1

INVENTOR.
RALPH B. MENTZER
BY
Murray W. Gordon
ATTY.

June 12, 1951   R. B. MENTZER   2,557,055
SURFACE ORNAMENTING MACHINE
Filed Nov. 15, 1946   3 Sheets-Sheet 2

INVENTOR.
RALPH B. MENTZER
BY Murray W. Gould
ATTY.

June 12, 1951     R. B. MENTZER     2,557,055
SURFACE ORNAMENTING MACHINE

Filed Nov. 15, 1946     3 Sheets-Sheet 3

INVENTOR.
RALPH B. MENTZER
BY Murray W. Gould
ATTY.

Patented June 12, 1951

2,557,055

UNITED STATES PATENT OFFICE 2,557,055

SURFACE ORNAMENTING MACHINE

Ralph Bender Mentzer, Lancaster, Pa., assignor to Hamilton Watch Company, Lancaster, Pa.

Application November 15, 1946, Serial No. 710,018

5 Claims. (Cl. 90—24.3)

This invention relates to a machine for ornamenting bridges and plates used in horological and scientific instruments.

Heretofore, it has been the custom in watches of the better grades to ornament the plates and bridges by damaskeening. This process, which is carried out with a small high speed rotary lap, produces a series of fine lines on the surface of the plates, resulting in a pattern which for a number of years has been recognized by the jewelry trade as being indicative of fine watches. This is a skilled operation and one which requires very close attention on the part of a worker to each individual line or flute on each work piece.

The object of this invention is to provide a machine which will first insure an absolutely flat even surface on the plate or bridge, and secondly to provide the ornamenting markings which closely resemble damaskeening.

It is a further object of the present invention to provide a pair of cutters adapted to operate on a plate or bridge passing beneath and in contact with said cutters to first provide a flat even surface on the plate or bridge, and secondly to ornament the same with lines resembling damaskeening.

It is a still further object of the invention to provide a machine which will produce curved lines on said plate or bridge by means of a stationary cutter and a moving carriage for supporting the plate or bridge in contact with the cutter.

It is a still further object of the present invention to provide a machine for decorating watch plates and bridges by means of curved lines and to provide additional means for changing the character of the decoration by a simple adjustment on the machine.

It is a still further object of the present invention to provide a machine for ornamenting watch plates and bridges, and including a removable work-piece carrying jig so that different carrying jigs may be used with different types of watch bridges or plates.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is illustrated in the accompanying drawings in which.

Figure 1:
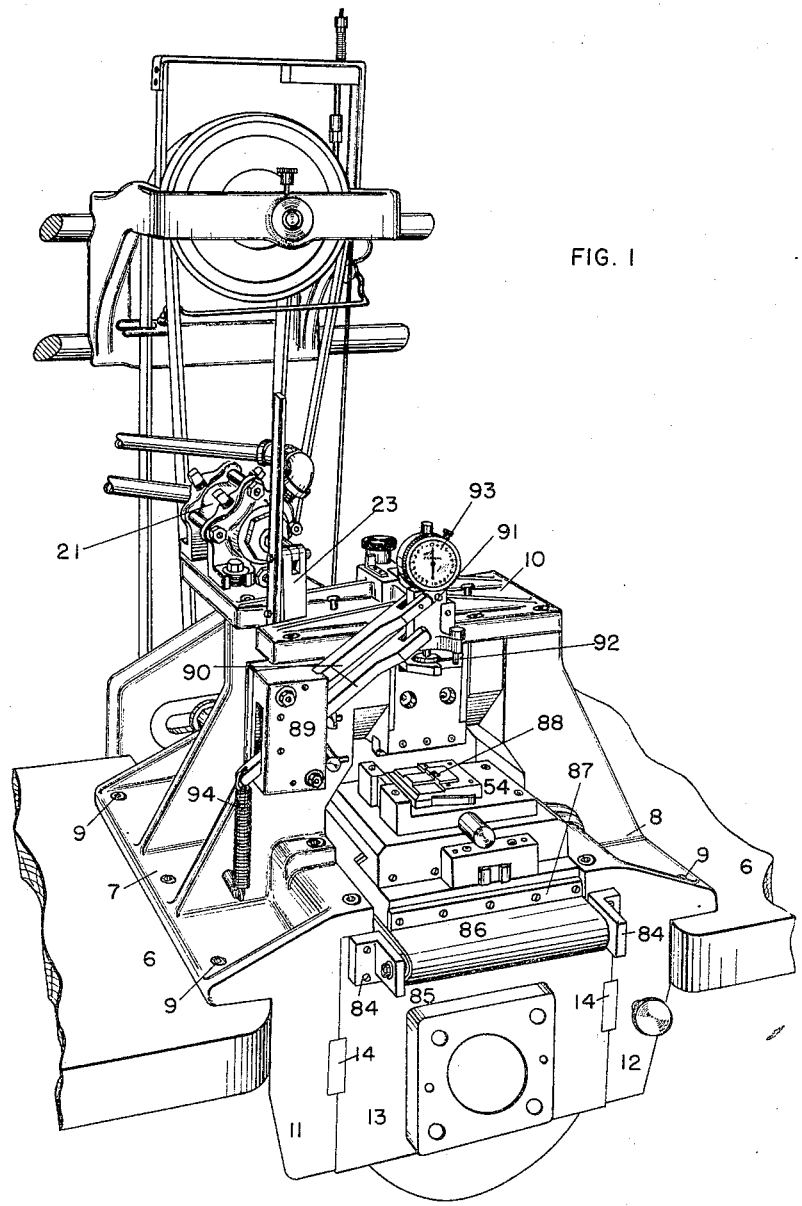
Figure 1 is a perspective view of the entire machine.
Figure 6:
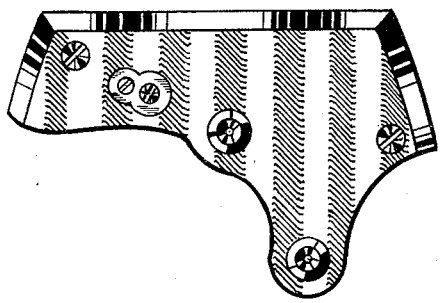

Referring to the drawings, more particularly to Figure 1, the machine comprises a table 6 supporting a pair of standards 7 and 8 secured to the table by screws 9 and to each other by means of a top plate 10. The lower sections 11 and 12 of the standards support a housing 13 through longitudinal keys 14 which extend the entire length of the machine. The standards 7 and 8 are formed at approximately their mid position with a shoulder which supports a sliding plate 17 in such a manner as to allow reciprocation of the plate substantially the entire length of the machine. The upper sections of the standards 7 and 8 form a bearing for a shaft 18 which supports a pair of cutter blades 19 and 20 and which is operated by means of a compressed air cylinder 21 through a rod 22 and a lever 23.

Figure 2:
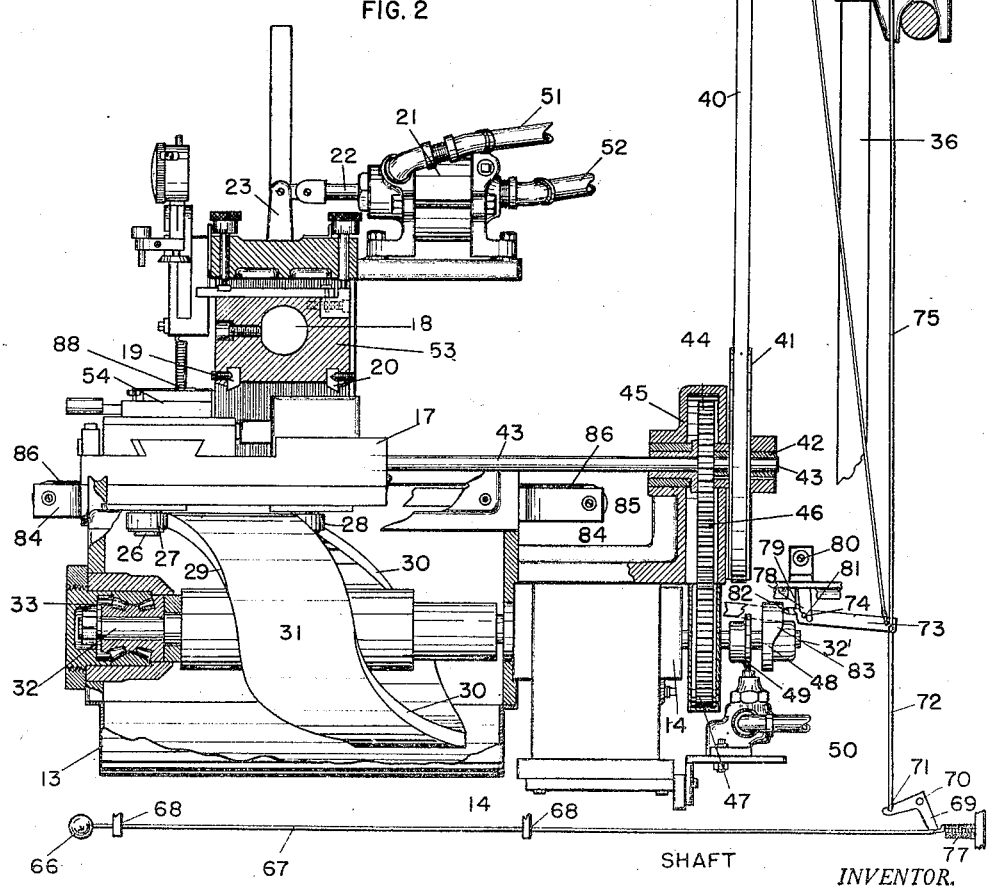
Figure 2 is a side elevation partly in section showing the operating cams, gear, and cutter blades.
Figure 3:
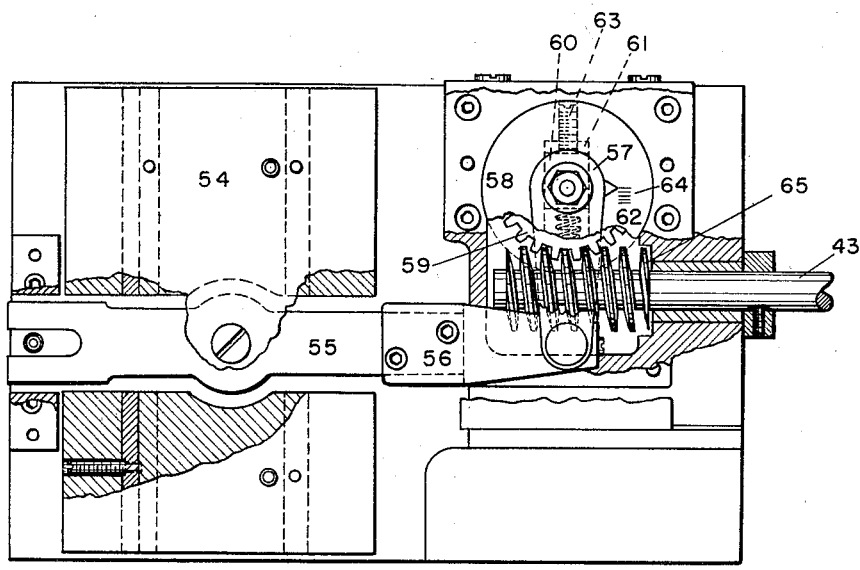
Figure 3 is a top plan partly in section of the cross-slide and the means for oscillating said slide together with the means for changing the periods of said oscillations to provide different ornamentation.
Figure 4:
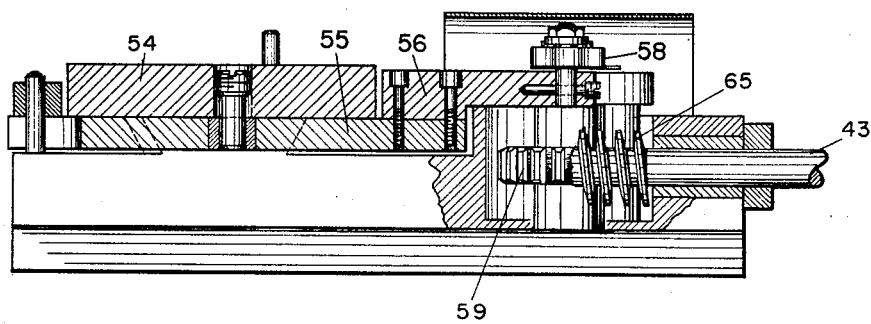
Figure 4 is a side elevation partly in section of the parts shown in Figure 3.
Figure 5:
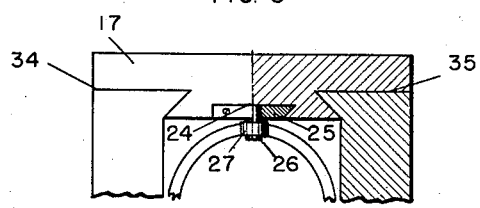

Referring to the housing 13, and more particularly to Figure 2 and Figure 5, the plate 17 has an auxiliary key-way 24 in which is mounted a slide 25. This slide supports a pair of pins 26 which carry rollers 27 and 28 engaging the sides 29 and 30 respectively of a cam 31. The cam 31 is carried in the housing 13 and mounted for rotation on a shaft 32 which is journalled in bearings 33. Adjustable means, not shown, but in the form of a pair of screws for moving the slide 25 in and out of the key-way 24 is provided for making a fine adjustment between the cam surface and the rollers and also to properly position the plate to be ornamented with respect to the cutter blades 19 and 20. Turning of the shaft 32 revolves the cam 31 and through the cam surfaces 29 and 30 and the rollers 27 and 28, the plate 17 is reciprocated on the flat surfaces 34 and 35 of the standards 7 and 8. This motion is comparatively slow and the machine is adapted to run through a complete cycle and stop, that is the piece to be ornamented is moved backward beneath the cutters and then brought forward for a complete cycle of operation.

The motive power for operating the machine is provided in two ways, first by an electric motor (not shown) for driving the shaft 32 and another mechanism not yet described and a compressed air cylinder 21 which is utilized for rocking the shaft 18 and the cutters 19 and 20. A power belt 36 driven from the motor drives either an idler pulley 37 or a working pulley 38. The pulley 38 drives pulley 39, belt 40 and pulley 41, which transmits its motion through the sleeve 42 which is carried on shaft 43 to the gear wheel 44. This gear wheel which is mounted on shaft 43 and contained within the housing 45 meshes with an idler gear 46 and is connected through said idler gear to a gear 47 keyed to the shaft 32. It will thus be seen that rotation of the motor turns the cam 31 through said shaft 32 and gear 47.

Fixed to the projecting end 32' of the shaft 32 are a pair of cams 48 and 49. Cam 48 is used in connection with the starting and cycle determining mechanism and will be hereinafter described. Cam 49 revolves with the shaft 32 and alternately depresses and releases a plunger 50 which operates a two way air valve (the mechanism of which is not shown and which forms no part of this invention). The operation of this valve admits air selectively through air line hoses 51 and 52 to move a piston within the cylinder 21 and so move the rod 22, lever 23 and rock the shaft 18 and its accompanying block 53. Securely mounted within the block 53 and at opposite sides are parallel cutters 19 and 20 which are alternately brought into the path of the bridge to be ornamented upon movement of the plate 17 longitudinally of the machine, the cutter 19 being rocked downward upon backward movement of the plate and the cutter 20 being brought into cutting position upon forward movement of the plate. This provides two cutting operations for each cycle of operation, the first insuring absolute thickness of material in the bridge and the second cutter providing the ornamentation.

Mounted on and moving with the plate 17 is a mechanism operated through the shaft 43 for reciprocating a cross-slide 54 in a direction at right angles to the movement of the plate 17. This mechanism consists of the pivotally mounted cross-slide 54 which is connected to a lever 55, said lever in turn being bolted to an extension 56 which is pivoted to a crank 57. The crank 57 is in turn pivotally mounted on a pin 58 which is adjusted to an off center position on the gear 59. The pin 58 proper is mounted in a block 60 which slides in a slot 61, being urged in one direction by a spring 62 and securely held in desired position by a set screw 63. Gage markings 64 are used to determine the desired position of the pin 58. Gear 59 is turned through the medium of a worm 65 which is connected to and forms part of the shaft 43. Movement of the pin 58 is a comparatively rapid vibration and serves together with the longitudinal movement of the plate 17 to provide a wavy ornamental line across a bridge which is carried by the jig 54' under the blades 19 and 20, said jig being removably mounted on the cross-slide 54.

The machine is designed to operate through a complete cycle of operation, that is the passing of one bridge beneath the cutters in both directions. The mechanism for accomplishing this cycle is shown as a starting button 66 connected to a rod 67 journalled in bearings 68 and connected to a bell crank 69 pivotally mounted at 70. The free end 71 of the bell crank 69 is connected to a rod 72 which in turn is attached to a lever 73. This lever is pivotally mounted at a point, not shown on the drawings, and carries a pin 74. Movement of the lever 73 downwardly about its pivot pulls on the rod 75 and operates a belt shifting mechanism 76 which moves the belt 36 from the idler pulley 37 to the working pulley 38. This movement of the belt 36 unto the operating pulley 38 is resisted by a spring 77 which is shown here attached to the bell crank 69 and serves to return the belt 36 to the idler pulley 37 upon release of the lever 73. The lever 73 is held in its downward position by reason of a pair of pivoted levers 78 and 79 which are secured to a shaft 80. The lever 78 is formed at its forward end with a notch 81 which engages the pin 74 of the lever 73 to hold the lever 73 in its downward position. The lever 79 carries a cam follower 82 which engages the cam 48 carried by the projecting end 32' of the shaft 32. With the engagement of the cam follower 82 with the thickened portion 83 of the cam 48, the lever 79 is swung counter-clockwise and followed by its attached lever 78. This releases the pin 74 from the notch 81 and allows the lever 73 to move upward under the influence of the spring 77. Thus it will be seen that the cam 31 is allowed to make one complete revolution moving the plate 17 backward the length of the machine and forward to its initial starting position. Carried at the front and rear of the housing 13 are brackets 84 which support rollers 85 carrying a curtain or apron 86 which covers the opening left by a passage of the plate 17 and prevents the chips from falling down into the housing 13. This apron 86 is attached by a clamping plate or other suitable means 87 at either end of the plate 17.

The removable jig 54' which is carried on the cross-slide 54 supports the bridge 88 to be ornamented and is interchangeable so that different jigs may be used with the same machine. This enables many different sizes and shapes of bridges or plates to receive surface ornamentation from the machine.

Fastened to the standard 7 is a housing 89 in which is pivotally mounted a pair of levers 90. These levers are pivoted to a gage 91 having a bridge engaging foot 92 and a dial 93. A spring 94 serves to normally hold the gage in its uppermost position. This gage is for assuring the initial seating of the bridge in the jig and is used by manually swinging the gage on its pivots so as to bring the gage foot 92 into contact with the bridge. The dial reading will then indicate the height of the bridge above the jig and indicate whether the bridge is firmly seated or not.

In the operation of the machine the bridge 88 to be ornamented is seated in the jig and the gage member 91 swung about its pivot to test as to whether the bridge is correctly seated. After ascertaining from the correct reading on the dial 93 that the bridge is in proper position, the machine is started by pressing the starting button 66 which swings the lever 73 downward and moves the power belt 36 from the idler pulley 37 to the operating pulley 38. This turns pulleys 39, 41 and gears 44 and 47. It is necessary as a safety precaution to hold the push button 66 in until the point 82 has ridden off of the high part of the cam 83. This high part is extended so as to prevent accidental touching of the push button 66 from setting the machine into its complete cycle of operation. Turning of the gear 47 turns the shaft 32 on which the cam 31 is mounted moving the rollers 27 and 28 together with the plate 17 backward on the surfaces 34, 35. The shaft 43 which is firmly attached to the plate 17 passes through the gear 45 and sleeves 42 to project outward at the back of the machine. Movement of the plate 17 on the surfaces 34 and 35 is simultaneous with the rapid vibration by means of the shaft 43, worm gear 65, gear 59 and lever 55. These two types of motion produce a sine wave curve as the path of motion of the bridge to be ornamented. As the bridge approaches cutter 19, the cam 49 depresses the plunger 50 admitting air to one side of the cylinder 21 and rocking the shaft 18 to move the cutter 19 into the path and into engagement with the bridge 88. This removes any material over a certain thickness of bridge and insures a thickness of bridge plate within a tolerance of one ten-thousandth of an inch. The plate 17 continues movement toward the rear of the machine and after passing the cutter 20 still moving toward the rear, the plunger 50 is allowed to move upward under the action of a spring (not shown) and air is admitted to the other side of the air chamber 21 again rocking the shaft 18 in the opposite direction and bringing the cutter 20 into the path of engagement with the bridge, which having reached the end of its travel is now returning. The cutter 20 is regulated so that it has very slight contact with the surface of the bridge and by reason of the motion of the bridge produces a series of wavy ornamental lines on the surface of the piece to be ornamented. Upon the return of the plate 17 to its initial position, the cam 83 contacting the cam follower 82 has moved the lever 78 to take the notch 81 out of engagement with the pin 74 and permit the lever 73 to move upward under the influence of the spring 77, thus swinging the belt 36 back into the idler pulley 37 and stopping the motion of the pulley 39 and gears 44 and 45.

What is claimed is:

1. A metal surface ornamenting machine comprising a pair of relatively stationary cutters, means for alternately positioning each of said cutters in the path of movement of the piece to be ornamented, means for moving said piece in a path at right angles to said cutting blades, means for simultaneously moving said piece in a path parallel to said cutting blades, said resultant path being a sine pattern.

2. A machine for ornamenting a small metal part comprising a pair of standards mounted in opposed relation to each other, said standards being formed each with a slide member adapted to cooperate to serve as a sliding base, a plate sliding on said base, cam followers attached to said base and projecting downwardly from said plate, a cam housing removably carried between said standards and below said sliding base, a cam mounted for rotation in said cam housing and engaging said cam followers to impart a definite motion to said plate, a cross-slide mounted on said sliding plate, means for moving said cross-slide at right angles to the path of motion of the sliding plate, a removable jig mounted on said cross-slide to hold the piece to be ornamented and a pair of relatively stationary cutters selectively positioned to engage the piece to be ornamented during the motion of the sliding plate and cross-slide.

3. A machine according to claim 2 including a mechanism for operating a pair of cutters.

4. A machine according to claim 2 including means for operating said mechanism through a predetermined cycle and for stopping said mechanism upon the completion of said cycle.

5. A machine according to claim 2 including a second cam mounted to rotate simultaneously with said first cam, and a cam follower engaging said second cam and serving as means for stopping the mechanism upon the completion of a predetermined cycle.

RALPH BENDER MENTZER.

REFERENCES CITED

The following references are of record in the file of this patent:

UNITED STATES PATENTS

| Number | Name | Date |
| --- | --- | --- |
| 197,787 | Mix | Dec. 4, 1877 |
| 278,139 | Horton | May 22, 1883 |
| 282,377 | Rossiter | July 31, 1883 |
| 464,875 | Hueffner | Dec. 8, 1891 |
| 852,189 | Marsh | Apr. 30, 1907 |
| 1,294,639 | Eaton | Feb. 18, 1919 |
| 1,420,319 | Kelley | June 20, 1922 |